US012366116B2

(12) United States Patent
Woodworth

(10) Patent No.: US 12,366,116 B2
(45) Date of Patent: Jul. 22, 2025

(54) ROOF RIDGE LADDER HOOK

(71) Applicant: Adam Woodworth, New Horton (CA)

(72) Inventor: Adam Woodworth, New Horton (CA)

( * ) Notice: Subject to any disclaimer, the term of this patent is extended or adjusted under 35 U.S.C. 154(b) by 530 days.

(21) Appl. No.: 17/972,582

(22) Filed: Oct. 24, 2022

(65) Prior Publication Data

US 2024/0133243 A1 Apr. 25, 2024
US 2024/0229559 A9 Jul. 11, 2024

(51) Int. Cl.
*E06C 1/36* (2006.01)
*E06C 1/34* (2006.01)
*E06C 7/48* (2006.01)

(52) U.S. Cl.
CPC ................ *E06C 1/36* (2013.01); *E06C 1/345* (2013.01); *E06C 7/488* (2013.01)

(58) Field of Classification Search
CPC ............. E06C 7/488; E06C 1/345; E06C 1/36
See application file for complete search history.

(56) References Cited

U.S. PATENT DOCUMENTS

| | | | | | | |
|---|---|---|---|---|---|---|
| 2,140,828 | A | * | 12/1938 | Carle | E06C 1/36 | 248/214 |
| 2,272,642 | A | * | 2/1942 | Owen | E06C 1/345 | 182/206 |
| 2,316,723 | A | * | 4/1943 | Sorenson | E06C 7/50 | 182/206 |
| 2,426,825 | A | * | 9/1947 | Geary | E04G 3/26 | 182/147 |
| 2,432,781 | A | * | 12/1947 | Mann | E06C 7/488 | 182/209 |
| 2,439,430 | A | * | 4/1948 | Hurd | E06C 1/36 | 248/210 |
| 2,448,716 | A | * | 9/1948 | Hurd | E06C 7/488 | 182/206 |
| 2,722,360 | A | * | 11/1955 | Malm | E06C 1/36 | 182/108 |
| 3,606,226 | A | * | 9/1971 | Bell | E06C 7/488 | 248/237 |
| 4,678,061 | A | * | 7/1987 | Jordan | E06C 1/345 | 182/206 |
| 4,938,312 | A | * | 7/1990 | Trail | E06C 7/488 | 182/209 |
| 6,513,625 | B1 | * | 2/2003 | Gaskins | E06C 7/488 | 182/206 |
| 6,913,114 | B1 | * | 7/2005 | Blehm | E04D 15/00 | 182/104 |
| 2005/0167201 | A1 | * | 8/2005 | Young, Jr. | E06C 7/488 | 182/206 |
| 2006/0054399 | A1 | * | 3/2006 | Dudschus | E06C 1/36 | 182/214 |
| 2014/0008150 | A1 | * | 1/2014 | Baglin | E06C 7/488 | 182/206 |

* cited by examiner

*Primary Examiner* — Gisele D Ford
(74) *Attorney, Agent, or Firm* — CAPEHART LAW FIRM

(57) ABSTRACT

An apparatus and method for supporting a ladder on a roof having a ridge is disclosed herein. The apparatus includes a frame, a roof anchor, a first ladder engagement portion, a second ladder engagement portion and a wheel assembly. The first ladder engagement portion and the second ladder engagement portion attach the apparatus to the ladder. The wheel assembly enables the apparatus to be easily rolled up and down the roof and the roof anchor anchors the apparatus over the ridge of the roof to attach the apparatus, and thus the ladder, to the roof.

20 Claims, 8 Drawing Sheets

ROOF RIDGE LADDER HOOK

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of ladders of existing art and more specifically relates to an apparatus for supporting a ladder on a roof.

RELATED ART

There are many reasons that an individual may need to access a roof. For example, professional roofers, chimney sweepers, painters, etc. all regularly need access to a roof in performance of their job. To gain access to the roof, it is often necessary for the individual to utilize a ladder. Often times, ladders are leaned against a building to stabilize the ladder and enable the individual to climb up the ladder to reach the roof. However, in the case of inclined roofs, and particularly when the individual needs to access the ridge of the roof (the point at which two roof side meet), simply stabilizing the ladder against the building/roof does not suffice. Often, an extension ladder is utilized and supported in an inclined position on one of the sides of the roof.

It is important to adequately support the ladder on the roof to prevent injury to the individual. Further, it is also important to minimize damage to the roof caused by sliding the extension ladder against the roof to position it. However, attempts made in the art to address these issues have not been satisfactory. Particularly, many of the current attempts either are permanently attached to the ladder (and thus not useable in every circumstance), do nothing to address the damage caused in positioning the extension ladder (and/or even itself cause damage to the roof), and/or do not permit use with a variety of ladders or a variety of roof pitches. As such, a suitable solution is desired.

SUMMARY OF THE INVENTION

In view of the foregoing disadvantages inherent in the known ladder support art, the present disclosure provides a roof ridge ladder hook. The general purpose of the present disclosure, which will be described subsequently in greater detail, is to provide an apparatus used for supporting a ladder on a roof; particularly, for supporting the ladder over a ridge of the roof. The apparatus also enables easy installation and removal of the apparatus to and from the roof.

An apparatus for supporting a ladder on a roof having a ridge is disclosed herein. The apparatus includes a frame, a roof anchor, a first ladder engagement portion, a second ladder engagement portion and a wheel assembly. The frame may include a top end opposite a bottom end defining a longitudinal axis therebetween. The roof anchor may be attached at the top end of the frame and generally extending outwardly therefrom. The first ladder engagement portion may be attached at the bottom end of the frame and extending outwardly therefrom in a direction opposite to the roof anchor. The first ladder engagement portion may be configured to attach to a second-to-top rung of a ladder.

The second ladder engagement portion may be attached behind the first ladder engagement portion and extending outwardly from the frame in the direction opposite to the roof anchor. The second ladder engagement portion may be configured to attach to a top rung of the ladder. Further, the wheel assembly may be attached to the second ladder engagement portion.

The apparatus may be able to be flipped 180 degrees relative to the longitudinal axis between a downward position and an upward position. The roof anchor may be configured to anchor the apparatus over the ridge of the roof in the downward position; and the wheel assembly may be configured to contact the roof in the upward position and enable rollable movement of the apparatus at least up and down the roof.

According to another embodiment, a method of using an apparatus for supporting a ladder on a roof having a ridge is also disclosed herein. The method may include the steps of: providing the apparatus as above; attaching the first ladder engagement portion to a second-to-top rung of the ladder; attaching the second ladder engagement portion to the top rung of the ladder, thereby attaching the apparatus to the ladder; grasping the ladder; rolling the apparatus up the roof (with the apparatus being in an upward position and the wheel assembly contacting the roof and enabling rollable movement of the apparatus) until the roof anchor reaches the ridge of the roof flipping the apparatus 180 degrees relative to the longitudinal axis, from the upward position to a downward position, thereby enabling the roof anchor to anchor the apparatus over the ridge of the roof and attach the apparatus and the ladder to the roof utilizing the ladder as needed for roof work; grasping the ladder when the ladder is no longer needed for the roof work; flipping the apparatus 180 degrees, thereby moving the apparatus from the downward position to the upward position and enabling the wheel assembly to contact the roof; rolling the apparatus down the roof; removing the second ladder engagement portion from the top rung of the ladder; and removing the first ladder engagement portion from the second-to-top rung of the ladder, thereby removing the apparatus from the ladder.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a roof ridge ladder hook, constructed and operative according to the teachings of the present disclosure.

The various embodiments of the present invention will hereinafter be described in conjunction with the appended drawings, wherein like designations denote like elements.

DETAILED DESCRIPTION

Figure 1:
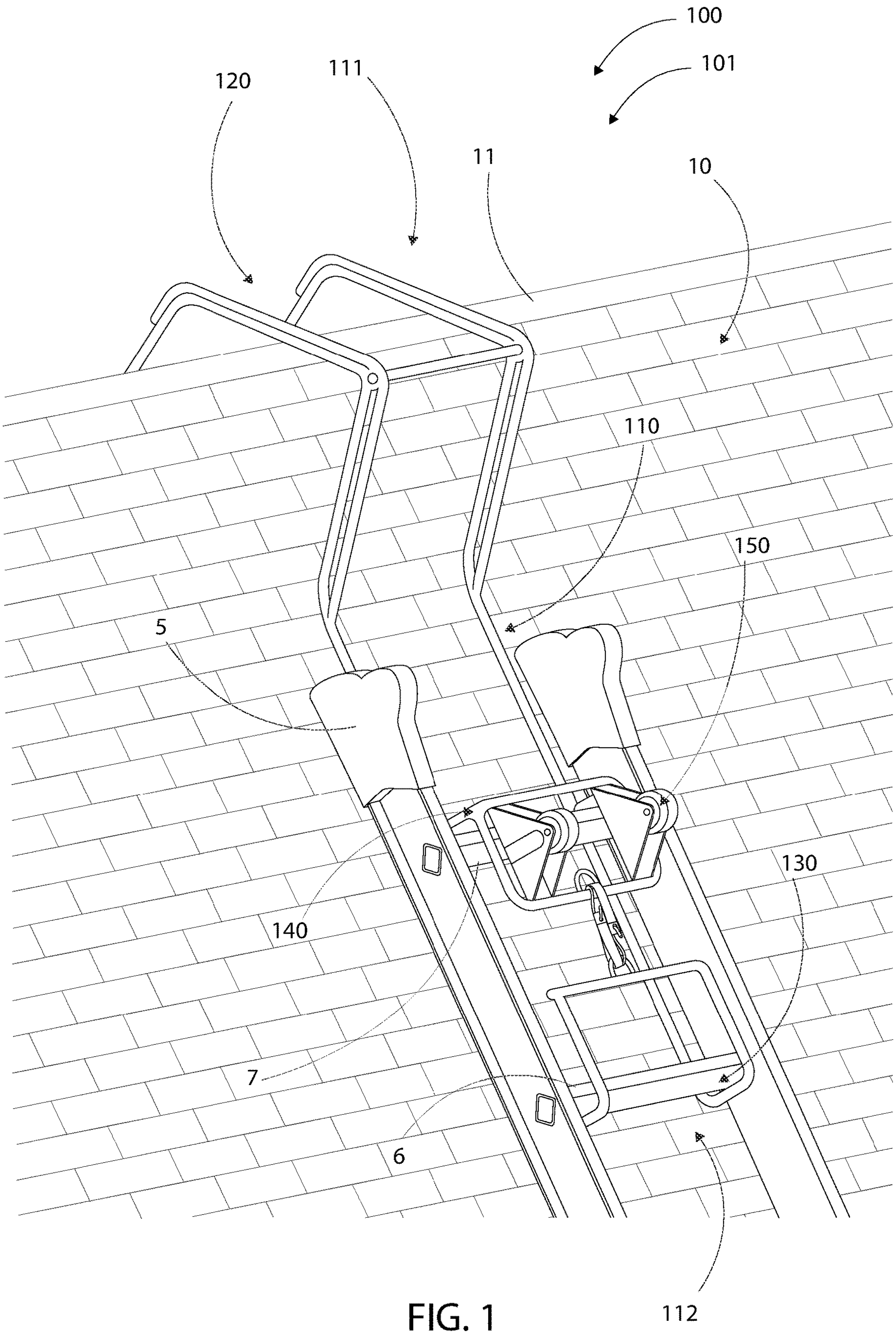
FIG. 1 is a perspective view of an apparatus being used to support a ladder on a roof having a ridge, the apparatus being in a downward position, according to an embodiment of the disclosure.

As discussed above, embodiments of the present disclosure relate to a ladder support and more particularly to a roof ridge ladder hook. Generally, the roof ridge ladder hook may include a frame that will fit any extension ladder and can be easily attached and detached therefrom. The roof ridge ladder hook is constructed from heavy duty steel to ensure that the roof ridge ladder hook does not bend or crack. The roof ridge ladder hook may connect by a first hook slipping over a second-to-top rung of the ladder; and then a second hook slipping over a top rung of the ladder. This enables the apparatus to be positioned all the way up to the ridge, or peak, of the roof. The roof ridge ladder hook may also include two wheels to enable the roof ridge ladder hook to be easily rolled up and down the roof for installation and removal.

Referring now more specifically to the drawings by numerals of reference, there is shown in FIGS. 1-7, various views of an apparatus 100 for supporting a ladder on a roof 10 having a ridge 11. As shown, the apparatus 100 may comprise a frame 110, a roof anchor 120, a first ladder engagement portion 130, a second ladder engagement portion 140, and a wheel assembly 150. As shown in FIGS. 1-4, the apparatus 100 is used for supporting a ladder 5 on a roof 10. Particularly, the apparatus 100 is for use with a roof 10 having a ridge 11, or a peak, at where two roof sides meet.

As discussed above, the apparatus 100 may be constructed from a solid heavy duty steel to prevent bending or cracking of the apparatus 100; particularly when strained during support of the ladder 5. In some embodiments, the apparatus 100 may be constructed from ½ inch or 9/16 inch steel round bar and may weigh generally between 13-17 lb (depending on thickness of the round bar). Further, in some embodiments, the apparatus 100 may include a width of 9 inches; a depth of 16 inches; and a length of 33½ inches. It should however be appreciated that the dimensions provided here are given as examples only and do not limit the apparatus 100 to these dimensions or particular construction.

Figure 2:
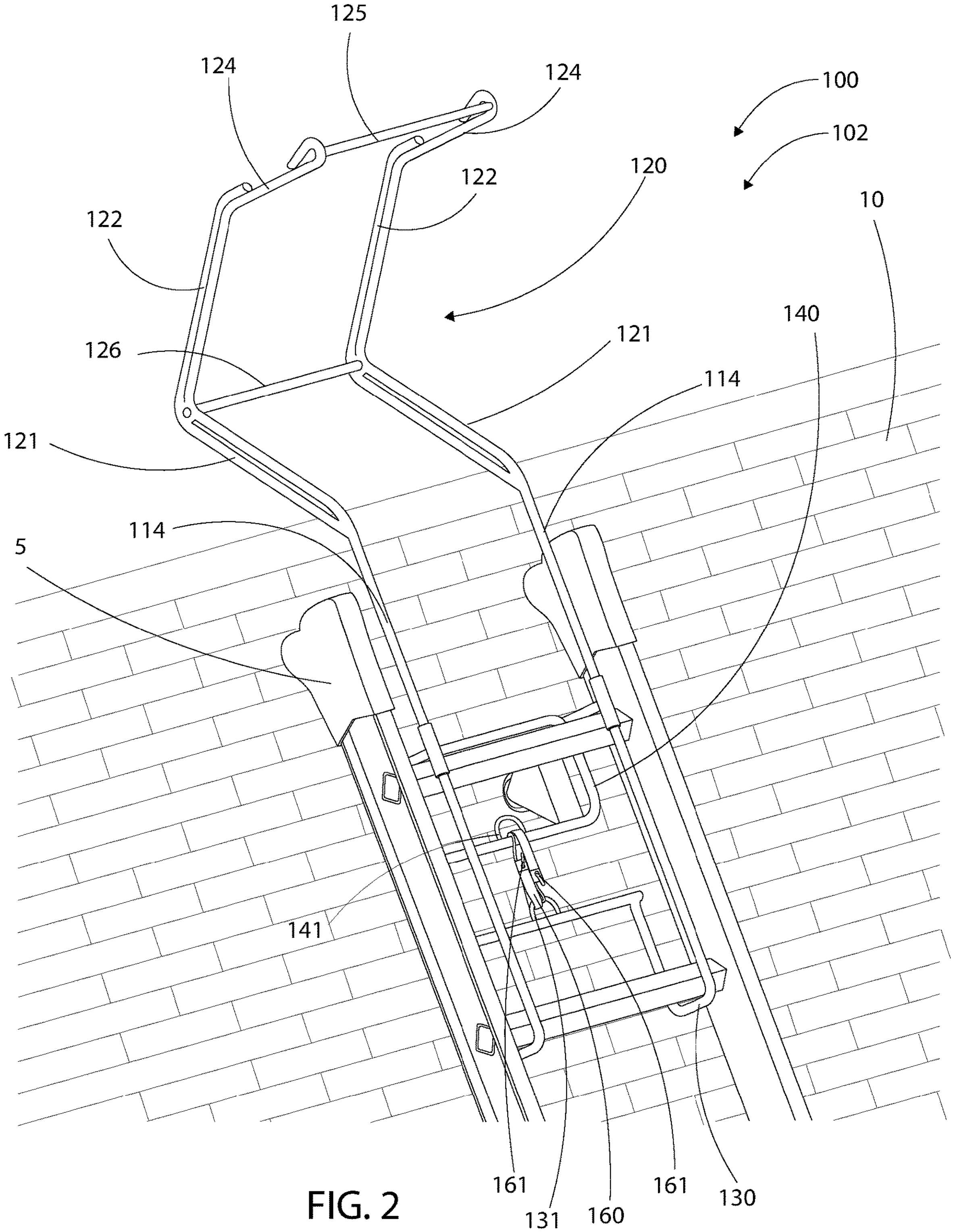
FIG. 2 is a perspective view of the apparatus being used to roll a ladder up and down the roof, the apparatus being in an upward position, according to an embodiment of the disclosure.
Figure 3:
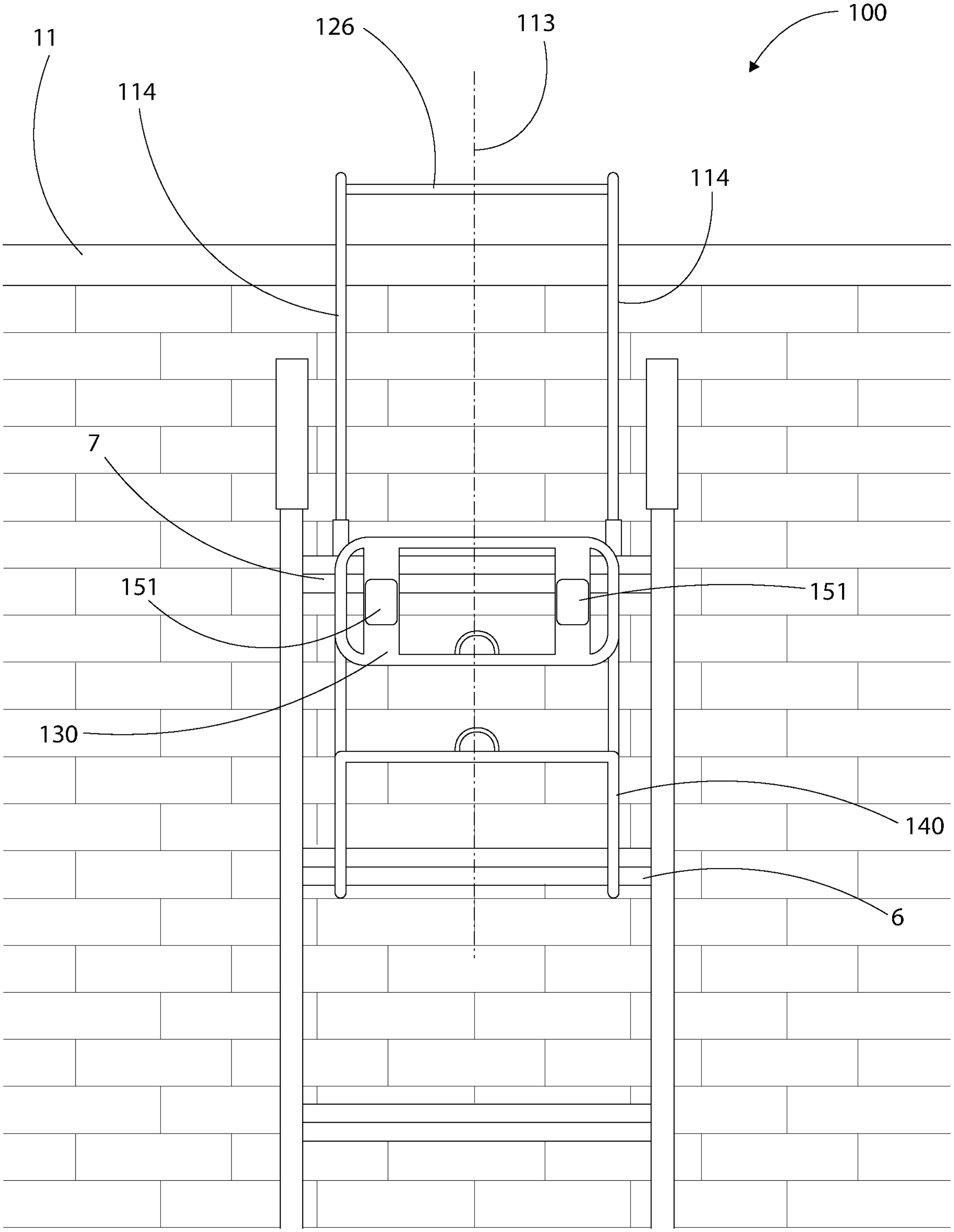
FIG. 3 is a front view of the apparatus being used to support the ladder on the roof having the ridge, according to an embodiment of the present disclosure.

As shown in FIGS. 1-3, the frame 110 may include a top end 111 opposite a bottom end 112 and defining a longitudinal axis 113 therebetween. As shown, when the apparatus 100 is attached to the roof 10 it, and the ladder 5, may rest against the roof 10. The frame 110 may further include a pair of longitudinal bars 114 defining a left side and a right side of the frame 110 and a main structure of the frame 110. In some embodiments, the roof anchor 120, the first ladder engagement portion 130, and the second ladder engagement portion 140 may be integral to the frame 110. For example, the roof anchor 120 may be formed from the pair of longitudinal bars 114, and/or may be fused/welded to the pair of longitudinal bars 114. Similarly, at least a portion of the ladder engagement portions 130, 140 may be formed from the pair of longitudinal bars 114.

The roof anchor 120 may be attached at the top end 111 of the frame 110 and generally extending outwardly therefrom. Further, the wheel assembly 150 may be attached to the second ladder engagement portion 140. The wheel assembly 150 may include a pair of wheels 151 (FIG. 3 and FIG. 7) each attached to one of a pair of wheel brackets 152 (FIG. 6) at opposing sides of the second ladder engagement portion 140. In some embodiments, the pair of wheel brackets 152 may hold the pair of wheels 151 straight such that the wheels 151 are unable to rotate and thus only travel in a linear motion.

As demonstrated particularly in FIGS. 1-2, the apparatus 100 may be able to be flipped 180 degrees relative to the longitudinal axis 113 between a downward position 101 (or a 'hooked position') as shown in FIG. 1, and an upward position 102 (or a 'rolling position') as shown in FIG. 2. As shown in FIG. 1 (and FIG. 4), the roof anchor 120 may be configured to anchor the apparatus 100 over the ridge 11 of the roof 10, or cradle the ridge 11 of the roof 10, in the downward position 101; and as shown in FIG. 2, the wheel assembly 150 may be configured to contact the roof 10 in the upward position 102 and enable rollable movement of the apparatus 100 at least up and down the roof 10.

In some examples, a user may hold the ladder 5 (the ladder 5 being attached to the apparatus 100) and with the apparatus 100 in the upward position 102, roll the apparatus 100 up the roof 10 (using the ladder 5 as a handle of sorts) until the roof anchor 120 is about the ridge 11 of the roof 10. The user may then 'flip' the apparatus 100 180 degrees (using the ladder 5) so that the apparatus 100 is in the downward position 101 and the roof anchor 120 is anchored over the ridge 11 of the roof 10. The apparatus 100, and the ladder 5, is then held on the roof 10 by the roof anchor 120 utilizing the weight of the ladder 5. To bring the apparatus 100 down from the roof 10, the user may then flip the apparatus 100 180 degrees back to the upward position 102 and roll the apparatus 100 down the roof 10 (again by holding onto the ladder 5). Due to the general height of roof ridges, the user may accomplish this by standing on a second ladder.

Figure 4:
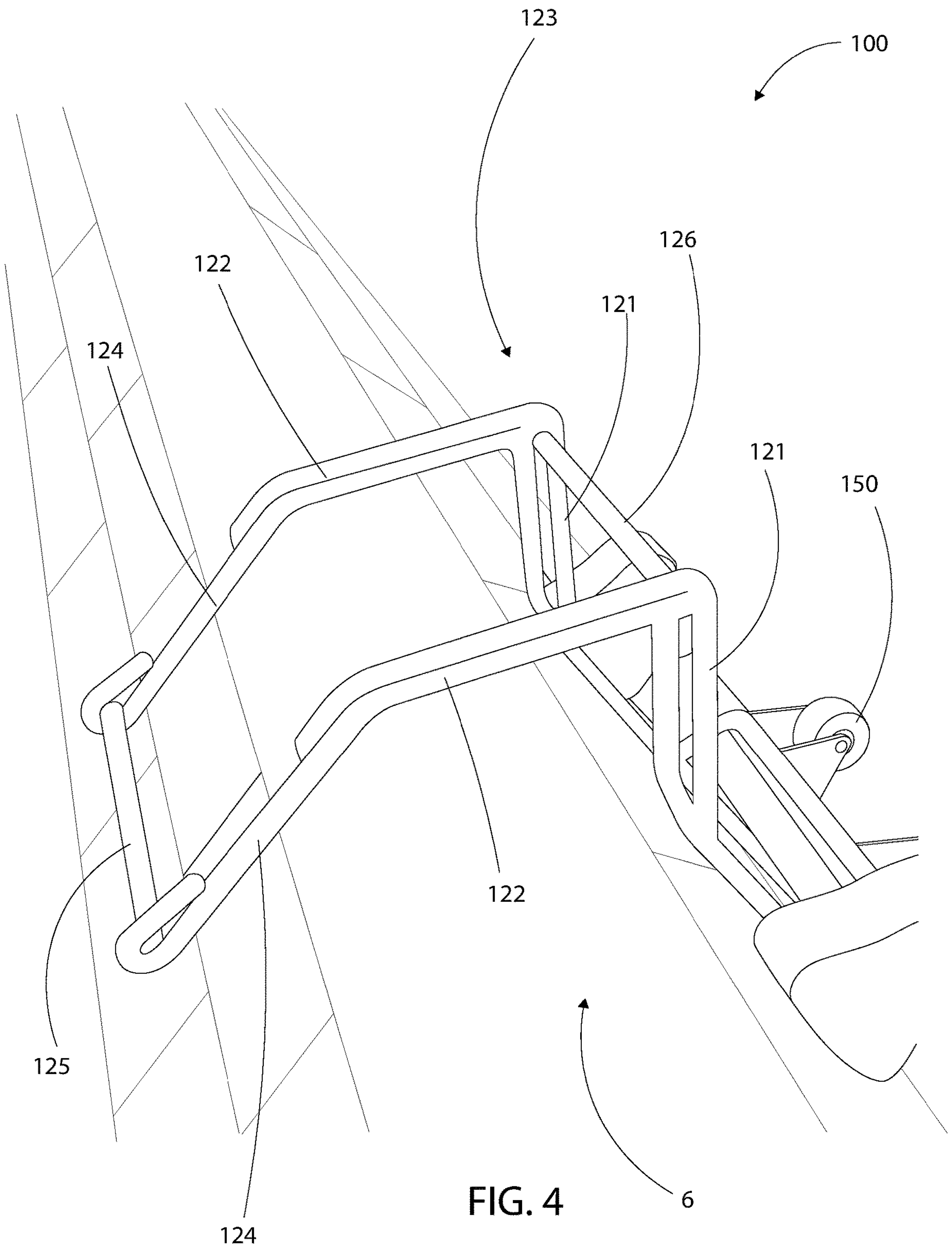
FIG. 4 is a rear perspective view of the apparatus being used to support the ladder on the roof having the ridge and particularly illustrating a roof anchor of the apparatus anchoring the apparatus over the ridge of the roof, according to an embodiment of the present disclosure.

As shown in FIGS. 2-4 particularly, the roof anchor 120 may include a pair of upward sections 121 each attached to one of the pair of longitudinal bars 114. A pair of outward sections 122 may each extend from one of the pair of upward sections 121 substantially perpendicular thereto and thus forming a right angle, or an angle slightly lesser than 90°. Together, the pair of outward sections 122 and the pair of upward sections 121 may define an apex 123 of the roof anchor 120. Particularly, the point at which the pair of outward sections 122 and the pair of upward sections 121 meet may define the apex 123 of the roof anchor 120.

Further, a pair of downward sections 124 may each extend at an obtuse angle from one of the pair of outward sections 122. For example, the pair of downward sections 124 may extend at an angle between (but not limited to) 100°-150°. In addition, the roof anchor 120 may include a first crossbar 125 and a second crossbar 126. The first crossbar 125 may be attached between the pair of downward sections 124 at the top end 111 of the frame 110 and the second crossbar 126 may be located at the apex 123 of the roof anchor 120. In some embodiments, the second crossbar 126 may be utilized as a handle when attaching the ladder 5 to the apparatus 100. As shown in FIG. 4, the first crossbar 125 may contact a (first) side of the roof 10 when the roof anchor 120 is anchored to the roof 10 (and the ladder 5 is held at a [second] side of the roof 10). This first crossbar 125 (along with at least a portion of the pair of downward sections 124) may be pressed against the side of the roof 10 by the weight of the ladder 5, thereby utilizing the ladder's 5 own weight to hold the apparatus 100 and the ladder 5 at the second side of the roof 10.

Figure 5:
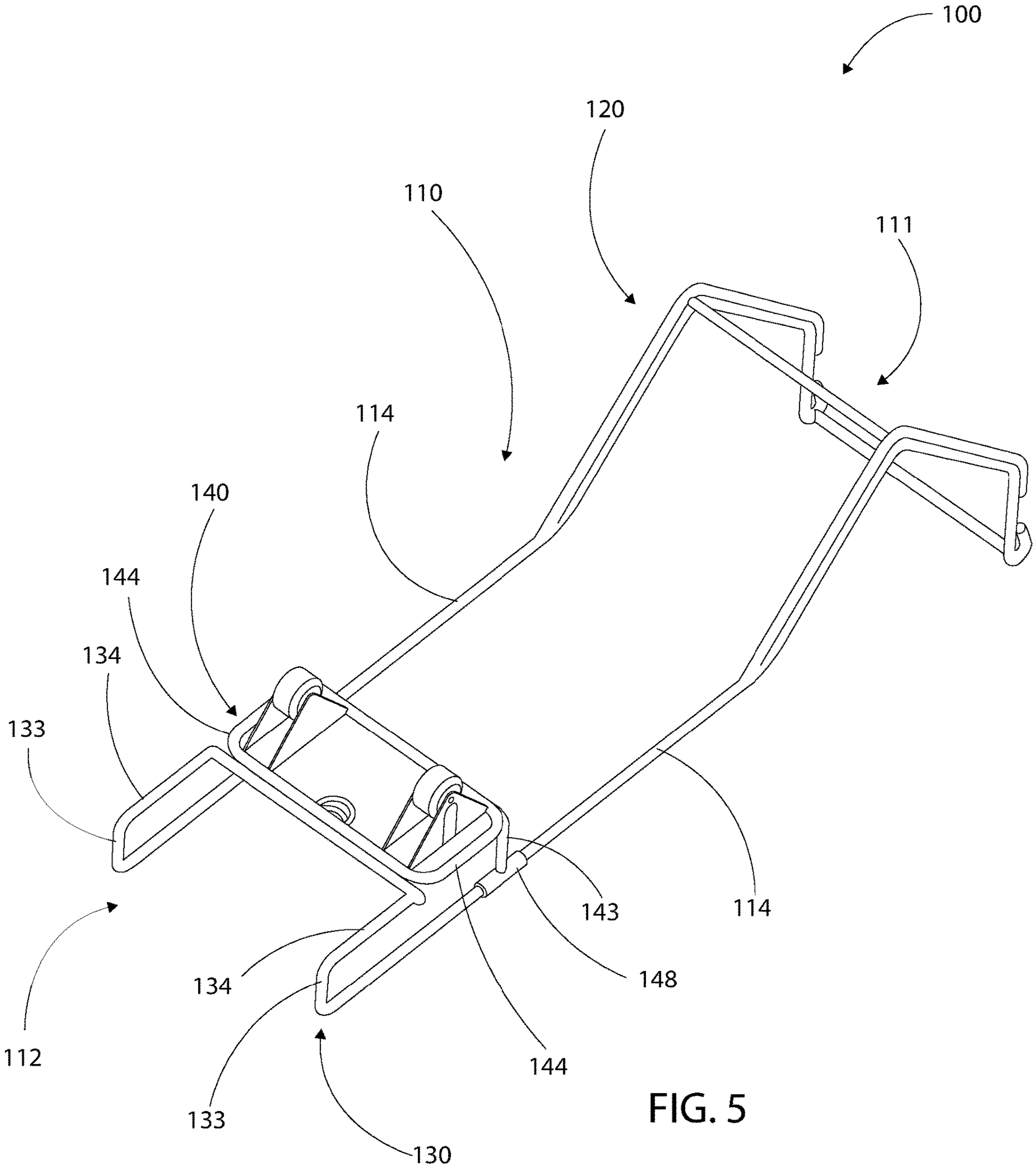
FIG. 5 is a side perspective view of the apparatus illustrating a first ladder engagement portion and a second ladder engagement portion, according to an embodiment of the present disclosure.
Figure 6:
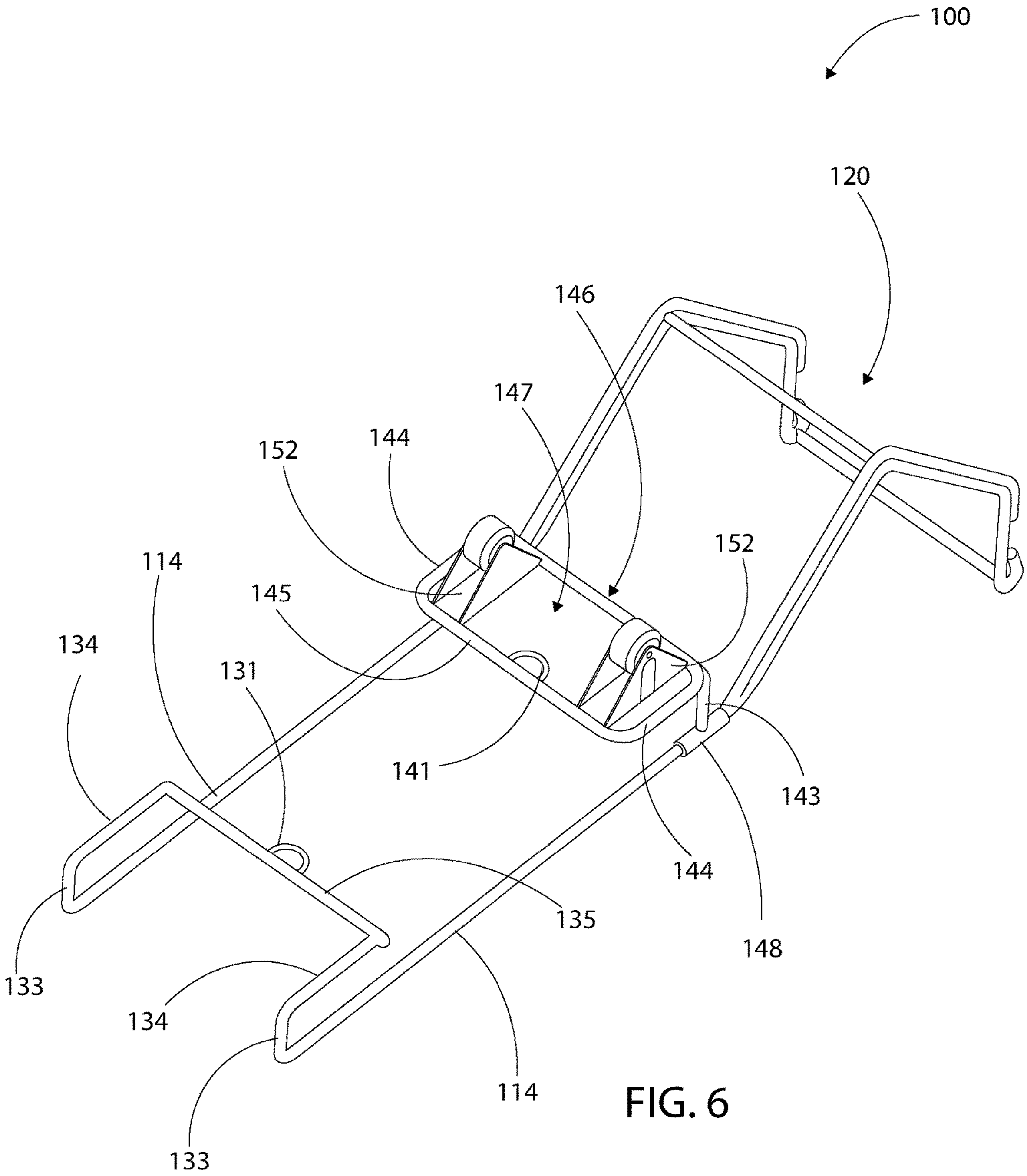
FIG. 6 is a side perspective view of the apparatus illustrating the first ladder engagement portion and the second ladder engagement portion with the second ladder engagement portion having been moved away from the first ladder engagement portion, according to an embodiment of the present disclosure.
Figure 7:
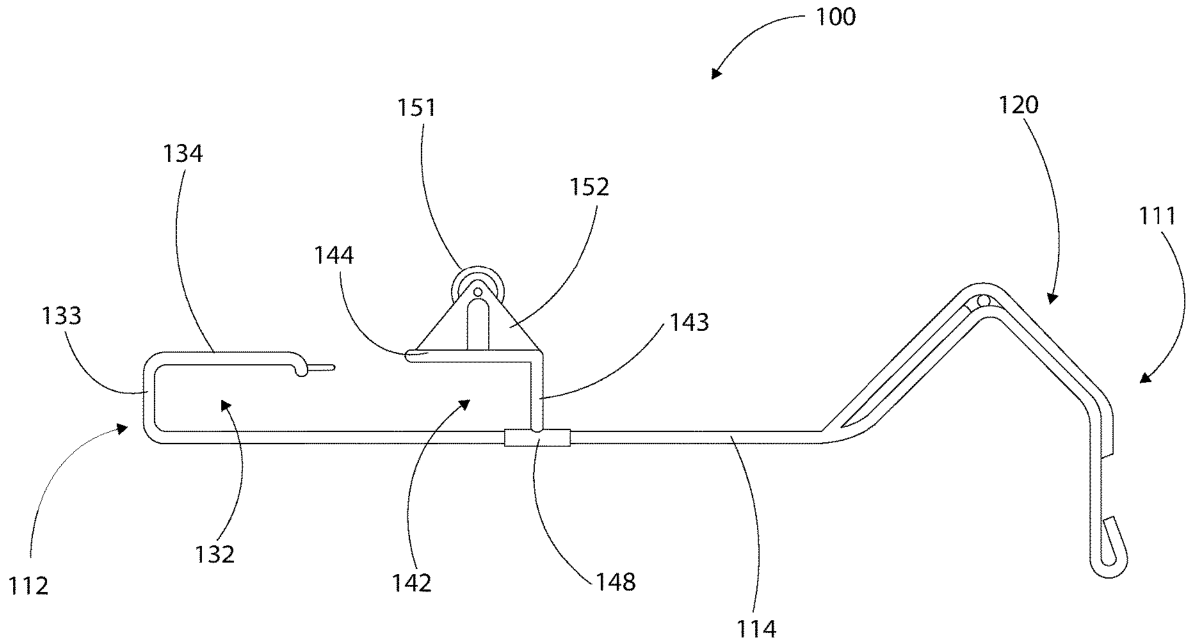
FIG. 7 is a side view of the apparatus, according to an embodiment of the present disclosure.

As shown more specifically in FIGS. 5-7, there is shown the first ladder engagement portion 130 and the second ladder engagement portion 140. As shown, the first ladder engagement portion 130 may be attached at the bottom end 112 of the frame 110 and the second ladder engagement portion 140 may be attached behind the first ladder engagement portion 130 (further along the pair of longitudinal bars 114). Both the first ladder engagement portion 130 and the second ladder engagement portion 140 may extend outwardly from the frame 110 in a direction opposite to the roof anchor 120. For example, in the downward position 101 (FIG. 1) the roof anchor 120 may extend forward and the ladder engagement portions 130, 140 may extend rearward (relative to the roof 10); and in the upward position 102 (FIG. 2), the roof anchor 120 may extend rearward and the ladder engagement portions 130, 140 may extend forward (relative to the roof 10).

The first ladder engagement portion 130 may be configured to hook onto a second-to-top rung 6 of the ladder 5 (FIGS. 1-3) and the second ladder engagement portion 140 may be configured to hook onto a top rung 7 of the ladder 5 (FIGS. 1-3), thereby attaching the apparatus 100 to the ladder 5. Preferably, the first ladder engagement portion 130 and the second ladder engagement portion 140 may each include a hook having a generally U-shaped cross-section. Particularly, as shown in FIGS. 5-7, the ladder engagement portions 130, 140 may each include a pair of outward portions 133, 143 extending perpendicular to the pair of longitudinal bars 114, and a pair of parallel side portions 134, 144 extending perpendicular to the pair of outward portions 133, 143 and parallel to the pair of longitudinal bars 114.

Further, each of the ladder engagement portions 130, 140 may include a cross-portion 135, 145 spanning between the pair of parallel side portions 134, 144. In some embodiments, the second ladder engagement portion 140 may include the cross-portion 145 and the pair of parallel side portions 144 being part of a wheel frame 146 on which the pair of wheel brackets 152 are attached. For example, the wheel frame 146 may be a (generally) rectangular frame, with the cross-portion 145 defining a bottom side thereof and the pair of parallel side portions 144 defining left and right sides thereof. The wheel frame 146 may define a frame opening 147, and the pair of wheel brackets 152 may be seated at either side of the frame opening 147 (at the left and right sides of the wheel frame 146). In some embodiments, the pair of wheel brackets 152 may be fixed to the wheel frame 146. For example, the pair of wheel brackets 152 may be fused, or welded, to the wheel frame 146.

As demonstrated in FIGS. 5-6, the second ladder engagement portion 140 may be movably connected to the pair of longitudinal bars 114 such that a distance between the first ladder engagement portion 130 and the second ladder engagement portion 140 is adjustable. Thus, this enables the apparatus 100 to be used with any sized ladder 5. Particularly, the second ladder engagement portion 140 may be configured for linear movement along the pair of longitudinal bars 114. In this embodiment, the pair of outward portions 143 on the second ladder engagement portion 140 may each connect to a pair of movement portions 148 having a generally cylindrical profile and each encircling one of the pair of longitudinal bars 114. As such, the pair of movement portions 148, and thus the second ladder engagement portion 140 (and the wheel assembly 150) are able to move along the pair of longitudinal bars 114.

In some embodiments, as shown in FIGS. 5-7 particularly, the first ladder engagement portion 130 may be oriented such that an opening 132 of the first ladder engagement portion 130 is facing the top end 111 of the frame 110; and the second ladder engagement portion 140 may be oriented such that an opening 142 of the second engagement portion 140 is facing the bottom end 112 of the frame 110.

In one example, the first ladder engagement portion 130 may first be hooked onto the second-to-top rung 6 (FIGS. 1-3) and the second ladder engagement portion 140 may then be moved to narrow or expand the distance between the ladder engagement portions 130, 140 (if needed) and hook the second ladder engagement portion 140 onto the top rung 7 (FIGS. 1-3). To further secure the ladder 5 to the apparatus 100 and prevent movement of the second ladder engagement portion 140, as shown particularly in FIGS. 5-6, the first ladder engagement portion 130 may include a first strap attachment portion 131, the second ladder engagement portion 140 may include a second strap attachment portion 141; and the apparatus 100 may further comprise a strap 160 (shown in FIGS. 1-2 and specifically referenced in FIG. 2), and/or alternatively the strap may be an existing strap.

The strap 160 may attach to the first strap attachment portion 131 and the second strap attachment portion 141, thereby attaching the second ladder engagement portion 140 to the first ladder engagement portion 130 and preventing movement of the second ladder engagement portion 140. For example, as shown in FIGS. 5-6 particularly, in some embodiments the first strap attachment portion 131 and the second strap attachment portion 141 may each include (but are not limited to) a fixed D-ring. The fixed D-ring may be attached to each of the cross-portions 135, 145. As such, the strap 160 may be configured to thread through each of the strap attachment portions 131, 141 and lock the ladder engagement portions 130, 140 together.

Particularly, to lock, the strap 160 may include a hook 161 (FIG. 2) on each end thereof. As such, in one example, the user may hook a first end of the strap 160 to the fixed D-ring on the first ladder engagement portion 130 at a front side thereof (with hook 161 facing down), thread a second end of the strap 160 through the fixed D-ring on the second ladder engagement portion 140 from a front side thereof, thread the second end of the strap 160 through the fixed D-ring on the first ladder engagement portion 130 from a rear side thereof (hook 161 facing up), and hook the second end of the strap 160 to the fixed D-ring on the second ladder engagement portion 140 from the front side thereof (with hook 161 facing down). As such, the ladder engagement portions 130, 140 are locked together, preventing movement of the second ladder engagement portion 140; and the ladder 5 is securely attached to the apparatus 100.

It should be noted that, in this specification and the drawings, some elements that have substantially the same function and structure are denoted with the same reference signs, and repeated explanation omitted. It should also be appreciated that common but well understood elements that are useful or necessary in a commercially feasible embodiment are often not depicted throughout in order to facilitate a clearer view of the various embodiments of the present invention.

Figure 8:
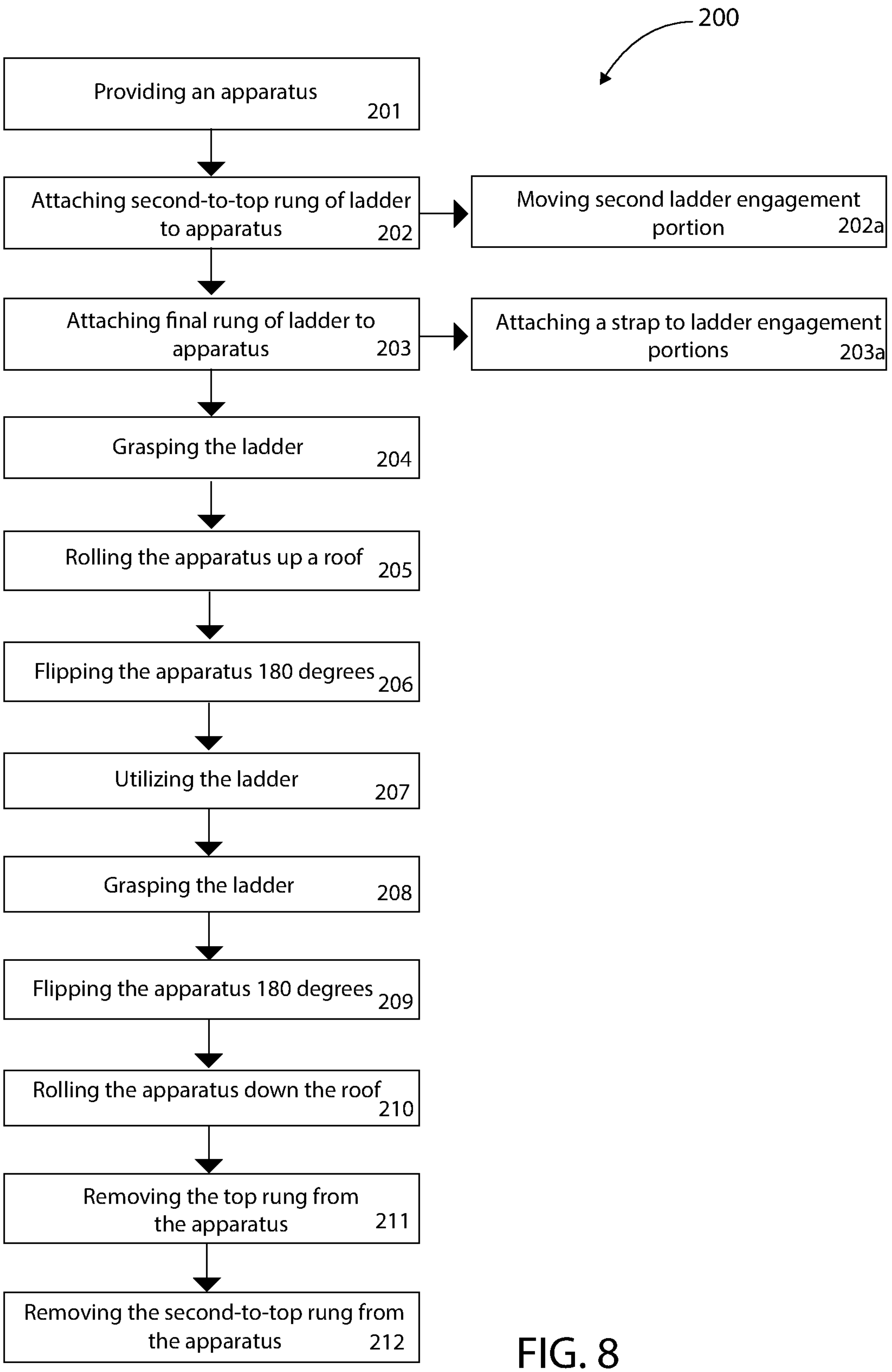
FIG. 8 is a flow diagram illustrating a method of using an apparatus for supporting a ladder on a roof having a ridge, according to an embodiment of the present disclosure.

Referring now to FIG. 8 showing a flow diagram illustrating a method 200 of using an apparatus for supporting a ladder on a roof having a ridge, according to an embodiment of the present disclosure. In particular, the method 200 may include one or more components or features of the apparatus 100 as described above. As illustrated, the method 200 may include the steps of: step one 201, providing the apparatus as above; step two 202, attaching the first ladder engagement portion to a second-to-top rung of the ladder; step three 203, attaching the second ladder engagement portion to the top rung of the ladder, thereby attaching the apparatus to the ladder; step four 204, grasping the ladder; step five 205, rolling the apparatus up the roof (with the apparatus being in an upward position and the wheel assembly contacting the roof and enabling rollable movement of the apparatus) until the roof anchor reaches the ridge of the roof; step six 206, flipping the apparatus 180 degrees relative to the longitudinal axis (from the upward position to a downward position) thereby enabling the roof anchor to anchor the apparatus over the ridge of the roof and attach the apparatus and the ladder to the roof; step seven 207, utilizing the ladder as needed for roof work; step eight 208, grasping the ladder when the ladder is no longer needed for the roof work; step nine 209, flipping the apparatus 180 degrees, thereby moving the apparatus from the downward position to the upward position and enabling the wheel assembly to contact the roof; step ten 210, rolling the apparatus down the roof; step eleven 211, removing the second ladder engagement portion from the top rung of the ladder; and step twelve 212, removing the first ladder engagement portion from the second-to-top rung of the ladder, thereby removing the apparatus from the ladder.

Further steps may include step 202*a*, moving the second ladder engagement portion along a pair of longitudinal bars of the frame to adjust a distance between the first ladder engagement portion and the second ladder engagement portion; and step 203*a*, attaching a strap having a hook at each end to a first strap attachment portion on the first ladder engagement portion and a second strap attachment portion on the second ladder engagement portion, thereby preventing movement of the second ladder engagement portion and securing the ladder to the apparatus.

It should be noted that certain steps are optional and may not be implemented in all cases. Optional steps of method 200 are illustrated using dotted lines in FIG. 8 so as to distinguish them from the other steps of method 200. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for using an apparatus for supporting a ladder on a roof having a ridge are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners

What is claimed is:

1. An apparatus for supporting a ladder on a roof having a ridge, the apparatus comprising:

a frame including a top end opposite a bottom end and defining a longitudinal axis therebetween;

a roof anchor attached at the top end of the frame and generally extending outwardly therefrom;

a first ladder engagement portion attached at the bottom end of the frame and extending outwardly therefrom in a direction opposite to the roof anchor, the first ladder engagement portion configured to attach to a second-to-top rung of the ladder;

a second ladder engagement portion attached behind the first ladder engagement portion and extending outwardly from the frame in the direction opposite to the roof anchor, the second ladder engagement portion configured to attach to a top rung of the ladder; and a wheel assembly attached to the second ladder engagement portion;

wherein the apparatus is able to be flipped 180 degrees relative to the longitudinal axis between a downward position and an upward position;

wherein the roof anchor is configured to anchor the apparatus over the ridge of the roof in the downward position; and wherein the wheel assembly is configured to contact the roof in the upward position and enable rollable movement of the apparatus at least up and down the roof.

2. The apparatus of claim 1, wherein the frame includes a pair of longitudinal bars defining a left side and a right side of the frame.

3. The apparatus of claim 2, wherein the roof anchor includes a pair of upward sections each attached to one of the pair of longitudinal bars, a pair of outward sections each extending from one of the pair of upward sections substantially perpendicular thereto and together forming an apex of the roof anchor, and a pair of downward sections each extending at an obtuse angle from one of the pair of outward sections.

4. The apparatus of claim 3, wherein the roof anchor further includes a first crossbar attached between the pair of downward sections at the top end of the frame, and a second crossbar located at the apex of the roof anchor, and wherein the first crossbar contacts a first side of the roof when the roof anchor is anchored to the roof, the ladder being held at a second side of the roof.

5. The apparatus of claim 4, wherein the second crossbar is useable as a handle during attachment of the apparatus to the ladder.

6. The apparatus of claim 5, wherein the second ladder engagement portion is movably connected to the pair of longitudinal bars such that a distance between the first ladder engagement portion and the second ladder engagement portion is adjustable.

7. The apparatus of claim 6, wherein the second ladder engagement portion is configured for linear movement along the pair of longitudinal bars.

8. The apparatus of claim 7, wherein the first ladder engagement portion includes a first strap attachment portion, wherein the second ladder engagement portion includes a second strap attachment portion, and wherein the apparatus further comprises a strap configured to attach to the first strap attachment portion and the second strap attachment portion, thereby attaching the second ladder engagement portion to the first ladder engagement portion and preventing movement of the second ladder engagement portion.

9. The apparatus of claim 8, wherein the first ladder engagement portion and the second ladder engagement portion each include a hook having a generally U-shaped cross-section.

10. The apparatus of claim 9, wherein the wheel assembly includes a pair of wheels each attached to one of a pair of wheel brackets at opposing sides of the second ladder engagement portion.

11. The apparatus of claim 9, wherein the first engagement portion is oriented such that an opening of the first ladder engagement portion is facing the top end of the frame.

12. The apparatus of claim 11, wherein the second engagement portion is oriented such that an opening of the second ladder engagement portion is facing the bottom end of the frame.

13. An apparatus for supporting a ladder on a roof having a ridge, the apparatus comprising:
- a frame including a top end opposite a bottom end defining a longitudinal axis therebetween and a pair of longitudinal bars defining a left side and a right side of the frame;
- a roof anchor attached at the top end of the frame and generally extending outwardly therefrom, the roof anchor including a pair of upward sections each attached to one of the pair of longitudinal bars, a pair of outward sections each extending from one of the pair of upward sections substantially perpendicular thereto and together forming an apex of the roof anchor, a pair of downward sections each extending at an obtuse angle from one of the pair of outward sections, a first crossbar attached between the pair of downward sections at the top end of the frame, and a second crossbar located at the apex of the roof anchor;
- a first ladder engagement portion attached at the bottom end of the frame and extending outwardly therefrom in a direction opposite to the roof anchor, the first ladder engagement portion configured to attach to a second-to-top rung of a ladder;
- a second ladder engagement portion attached behind the first ladder engagement portion and extending outwardly from the frame in the direction opposite to the roof anchor, the second ladder engagement portion movably connected to the pair of longitudinal bars such that a distance between the first ladder engagement portion and the second ladder engagement portion is adjustable, the second ladder engagement portion configured to attach to a top rung of the ladder; and
- a wheel assembly attached to the second ladder engagement portion, the wheel assembly including a pair of wheels each attached to one of a pair of wheel brackets at opposing sides of the second ladder engagement portion;
- wherein the apparatus is able to be flipped 180 degrees relative to the longitudinal axis between a downward position and an upward position;
- wherein the roof anchor is configured to anchor the apparatus over the ridge of the roof in the downward position; and
- wherein the wheel assembly is configured to contact the roof in the upward position and enable rollable movement of the apparatus at least up and down the roof.

14. The apparatus of claim 13, wherein the first ladder engagement portion and the second ladder engagement portion each include a hook having a generally U-shaped cross-section.

15. The apparatus of claim 14, wherein the second ladder engagement portion is configured for linear movement along the pair of longitudinal bars.

16. The apparatus of claim 15, wherein the first ladder engagement portion includes a first strap attachment portion, wherein the second ladder engagement portion includes a second strap attachment portion, and wherein the apparatus further comprises a strap configured to attach to the first strap attachment portion and the second strap attachment portion, thereby attaching the second ladder engagement portion to the first ladder engagement portion and preventing movement of the second ladder engagement portion.

17. The apparatus of claim 16, wherein the first engagement portion is oriented such that an opening of the first engagement portion is facing the top end of the frame, and wherein the second engagement portion is oriented such that an opening of the second engagement portion is facing the bottom end of the frame.

18. A method of using an apparatus for supporting a ladder on a roof having a ridge, the method comprising the steps of:
- providing the apparatus including:
  - a frame including a top end opposite a bottom end and defining a longitudinal axis therebetween;
  - a roof anchor attached at the top end of the frame and generally extending outwardly therefrom;
  - a first ladder engagement portion attached at the bottom end of the frame and extending outwardly therefrom in a direction opposite to the roof anchor;
  - a second ladder engagement portion attached behind the first ladder engagement portion and extending outwardly from the frame in the direction opposite to the roof anchor; and
  - a wheel assembly attached to the second ladder engagement portion;
- attaching the first ladder engagement portion to a second-to-top rung of the ladder;
- attaching the second ladder engagement portion to the top rung of the ladder, thereby attaching the apparatus to the ladder;
- grasping the ladder;
- rolling the apparatus up the roof, with the apparatus being in an upward position and the wheel assembly contacting the roof and enabling rollable movement of the apparatus, until the roof anchor reaches the ridge of the roof;
- flipping the apparatus 180 degrees relative to the longitudinal axis, from the upward position to a downward position, thereby enabling the roof anchor to anchor the apparatus over the ridge of the roof and attach the apparatus and the ladder to the roof;
- utilizing the ladder as needed for roof work;
- grasping the ladder when the ladder is no longer needed for the roof work;

flipping the apparatus 180 degrees, thereby moving the apparatus from the downward position to the upward position and enabling the wheel assembly to contact the roof;

rolling the apparatus down the roof;

removing the second ladder engagement portion from the top rung of the ladder; and removing the first ladder engagement portion from the second-to-top rung of the ladder, thereby removing the apparatus from the ladder.

19. The method of claim 18, further comprising an additional step of moving the second ladder engagement portion along a pair of longitudinal bars of the frame to adjust a distance between the first ladder engagement portion and the second ladder engagement portion.

20. The method of claim 19, further comprising the additional step of attaching a strap having a hook at each end to a first strap attachment portion on the first ladder engagement portion and a second strap attachment portion on the second ladder engagement portion, thereby preventing movement of the second ladder engagement portion and securing the ladder to the apparatus.

* * * * *